United States Patent [19]

Manos

[11] 4,080,744

[45] Mar. 28, 1978

[54] GAS SEPARATION MEMBRANE DRYING WITH WATER REPLACEMENT LIQUID

[75] Inventor: Philip Manos, Wilmington, Del.

[73] Assignee: E. I. Du Pont de Nemours and Company, Wilmington, Del.

[21] Appl. No.: 698,697

[22] Filed: Jun. 22, 1976

[51] Int. Cl.² .............................................. B01D 31/00
[52] U.S. Cl. ............................................. 34/9; 55/16; 210/500 M; 264/344
[58] Field of Search ............ 210/500 M, 23 H, 321 R; 55/16; 264/41, 330, 340, 344; 34/9; 260/2.5 A

[56] References Cited

U.S. PATENT DOCUMENTS

| 3,342,729 | 9/1967 | Strand .................... 55/16 X |
| 3,592,672 | 7/1971 | Rowley et al. ............. 210/500 M X |
| 3,710,945 | 1/1973 | Dismore ................... 210/500 M X |
| 3,822,202 | 7/1974 | Hoehn ..................... 210/23 H |
| 3,899,309 | 8/1975 | Hoehn et al. .............. 55/16 |

*Primary Examiner*—Frank A. Spear, Jr.

[57] ABSTRACT

Process for drying a water-wet permselective membrane by initially contacting the membrane with water replacement liquid having low surface tension and limited solubility for water.

5 Claims, No Drawings

GAS SEPARATION MEMBRANE DRYING WITH WATER REPLACEMENT LIQUID

BACKGROUND OF THE INVENTION

Separation processes such as dialysis, ultrafiltration, and reverse osmosis have been used in the separation of a wide variety of impurities from solutions. The development and improvement of membranes for such systems has permitted their use, for example, in the desalination of brackish and saline waters.

The eminent success of the membranes used in permselective applications has prompted consideration of their use in the separation of gases. Such membranes are generally prepared in a water-wet condition, and various techniques have been tested for removal of the water to dryness. Direct drying techniques, however carefully controlled, seem unsatisfactory. The replacement of the water with a series of polar and non-polar liquids has met with some success in the drying of cellulose acetate membranes. However, attempts to dry the highly desirable membranes of polymers having high surface tension have resulted in the destruction of the internal membrane structure that is critical to the function of such separatory membranes.

SUMMARY OF THE INVENTION

The instant invention provides a process for drying a class of water-wet permselective separatory membranes which results in substantial retention of the structure necessary for separatory performance and makes practical their use in gas separation applications.

Specifically, the instant invention provides an improvement in the process for drying semipermeable water-wet polymeric membrane by contacting the membrane with at least one water replacement liquid inert to the membrane and to the membrane-wetting liquid to substantially completely remove water from the membrane and removing the replacement liquid from the membrane, which improvement comprises contacting a membrane of a polymer having a Critical Surface Tension of at least about 42 dynes/cm at a temperature of about from 0° to 50° C with water replacement liquid comprising at least one organic solvent having a surface tension at 20° C of not more than about 35 dynes per centimeter, a viscosity less than about 10 centipoise, a molar volume less than about 200 cubic centimeters per mole at 20° C, a solubility for water not greater than about 20 weight percent at the contacting temperature, and a hydrogen bonding parameter of at least about 1 (calorie per cubic centimeter)$^{\frac{1}{2}}$.

DETAILED DESCRIPTION OF THE INVENTION

Membranes which can be dried according to the instant invention include semipermeable membranes of polymers having high surface tension and which rely at least in part on an internal physical structure for their performance. Included are membranes which are asymmetric, being formed with a relatively dense skin on one surface of a more porous structure. The polymers are characterized by a Critical Surface Tension of at least about 42 dynes/cm.

The Critical Surface Tensions of polymers are measured by techniques described by Baier and Zisman in Macromolecules, Volume 3, pages 462 to 468, 1970, employing glycerine, 2,2'-thiodiethanol, diiodomethane, and 1-bromonaphthalene, for example, as spreading liquids. Three to five measurements are made of the advancing contact angle of each liquid on a polymer surface as described by Shafrin and Zisman in the Journal of Colloid Science, Volume 7, pages 166 to 177, 1952, and the extrapolated surface tension at zero contact angle is calculated by linear regression (minimum sum of squares of deviations method). Similar procedures are described in "Contact Angle, Wettability and adhesion," R. F. Gould, editor, Advances in Chemistry Series No. 43, American Chemical Society, Washington, 1964, especially at pages 12 to 22. A recent tabulation of polymer Critical Surface Tension values, some of which were determined by procedures different from that described above, is given in "Polymer Handbook," Second Edition, J. Bandrup and E. H. Immergut, editors, Wiley, New York, 1975, at pages III-221 to III-228. Membranes of polymers having Critical Surface Tensions below about 42 dynes per centimeter, such as those prepared from highly acetylated cellulose acetate, can be dried without excessive loss in gas permeability properties by techniques outside the present invention process.

A wide variety of organic polymers can have Critical Surface Tensions of at least about 42 dynes per centimeter and can therefore be used in the preparation of membranes which can be dried according to the process of this invention. Included are membranes of aliphatic polyamides, such as those described by Cescon et al. in U.S. Pat. No. 3,551,331 and those of methoxymethyl nylons described by Hookway et al. In United Kingdom patent Specification No. 816,572 and of aromatic polyamides such as those described by Richter et al. in U.S. Pat. No. 3,567,632, by Ikeda et al. in U.S. Pat. No. 3,878,109, by McKinney et al. in U.S. Pat. No. 3,904,519, by Rio in U.S. Pat. No. 3,686,116, by Blanchard et al. in U.S. Pat. No. 3,619,424, and by Wrasidlo in U.S. Pat. No. 3,816,303, and of other nitrogen-linked polymers such as polyimidazopyrrolidones, polybenzimidazoles, polybenzimidazolones, polybenzoxazoles, polybenzothiazoles, polyimides, poly(ester-amides), poly(ether-amides), and polyureas. Still other specific membranes which can be dried by the instant process include those prepared from polyamides comprising the reaction products of piperazine and a dihalide of fumaric acid or of a substituted fumaric acid and from polyamides comprising the reaction products of a piperazine with a dicarboxylic acid or acid anhydride described by Credali in U.S. Pat. No. 3,696,031. Sulfonated poly(arylene ether sulfone) membranes which can be dried according to the instant invention include those prepared according to the teaching of Bournagel in U.S. Pat. No. 3,855,122 as well as Graef et al. in U.S. Pat. No. 3,875,096. Sulfonated poly(xylylene oxide) membranes which can also be so dried include those described by Salemme in U.S. Pat. No. 3,735,559. Membranes based on such polymers containing amide linkages, in particular those containing aromatic carboxamide linkages, constitute a particularly valuable class of polar membranes that can be advantageously dried by the method of this present invention. membranes of nitrogen-linked aromatic polymers containing ether or sulfone linkages can also be dried by this method.

The membrane can be in any form presenting a surface suitable for its permselective use, such as self-supporting films, hollow fibers and composite structures wherein the permselective polymer surmounts and is supported by a structure of a different composition, such as porous polymers, glass, or ceramic. Hollow fiber membranes present high surface areas and are preferred.

The separation membranes to which the present invention is applicable are prone to shrinkage when subjected to drying techniques outside of the instant invention. Shrinkage is readily observable as a decrease in the exposed area or a decrease in at least one linear dimension where the membrane is unrestrained as in a self-supporting film or a hollow fiber. Such dimensional change may not be evident when the membrane is restrained, as in the form of a permselective coating joined to an inert porous support, but may be manifest as a thickening of the skin of the permselective structure. In all these cases, however, the membranes exhibit a marked depreciation in flux when tested in gas separation applications.

The membranes dried by the instant process are water-wet. In the context of the present invention, the term water-wet is understood to mean that a major portion, that is, at least about 50 weight percent, of the liquid with which the membrane is wet is water. The remainder of the liquid with which the membrane is wet can be any polar or non-polar liquid, but more satisfactory results are generally obtained when the remainder of the membrane wetting liquid is a polar liquid, especially those selected from alcohols and polyols having from 1 to 4 carbon atoms.

In the course of this process the membranes may become wet with aqueous liquids containing less than 50% water, but in all cases the membrane is contacted with one or more water replacement liquids in sufficient steps to remove substantially all water from the membrane. Accordingly, the water replacement liquid in the last water replacement step is substantially water-free and the resulting liquid-wet membrane contains so little water that the properties of the dry membrane obtained after the remaining steps in the process are not significantly affected thereby.

In accordance with the various embodiments of the present invention, the water-wet membrane is contacted with water replacement liquid, each replacement liquid being an organic solvent or an aqueous mixture thereof. The organic solvent should be sufficiently inert to both the membrane and the components of the wetting liquid to avoid any significant depreciation of membrane properties. In addition, the organic solvent should be capable of penetrating the membrane, having suitable low viscosity and small molar volume. Those organic solvents having a viscosity of less than about 10 centipoise and a molar volume less than about 200 cubic centimeters per mole at 20° C are generally capable of penetrating the semipermeable membranes to which the invention is applicable. Especially good performance characteristics are obtained when the viscosity of the organic solvent is less than about 6 centipoise and the molar volume is not greater than about 125 cubic centimeters per mole. Molar volumes of many liquids are tabulated by Hansen and Beerbower in an article "Solubility Parameters" in the Kirk-Othmer "Encyclopedia of Chemical Technology," Second Edition, Supplementary Volume, pages 889 to 910, Wiley, New York, 1971, and by Barton in Chemical Reviews, Volume 75, pages 731 to 753, 1975.

In addition to the viscosity and molar volume characteristics, the organic solvent of the replacement liquid with which the water-wet membrane is first contacted should be polar enough in nature for sufficient miscibility with water. Accordingly, this solvent should exhibit a hydrogen bonding parameter of at least about one (calorie per cubic centimeter)$^{\frac{1}{2}}$, as determined by techniques known to those skilled in the art. The maximum hydrogen bonding parameter is not critical to the invention, but will generally not exceed about 8 (calories per cubic centimeter)$^{\frac{1}{2}}$. The hydrogen bonding parameters of many liquids are tabulated by Hansen and Beerbower and by Barton in the references cited above.

It has been found that an important function of the replacement liquid is the lowering of the surface tension of the membrane wetting liquid. Accordingly, the air-liquid surface tension of the organic solvent in the replacement liquid should be less than about 35 dynes per centimeter at 20° C and preferably less than about 30 dynes per centimeter.

The capacity of the initial replacement liquid to dissolve water should be low to minimize the adverse effect on gas flux normally encountered in the removal of water from such membranes. Accordingly, the organic solvent in the replacement liquid with which the water-wet membrane is first contacted should have a solubility for water not greater than about 20 weight percent at the temperature at which the membrane is contacted. In addition, the quantity of the first replacement liquid should preferably be insufficient to dissolve theoretically more than about 100%, and especially not more than 50%, of the water contained in the water-wet membrane.

Within the above requirements, the organic solvents of the replacement liquid with which the water-wet membrane is first contacted can vary widely. Aliphatic or acyclic materials are generally used because of their inherently lower surface tensions and viscosities than the analogous cyclic structures. For convenience, the compositions selected will normally be liquid at ambient temperatures and pressures, although substances which are liquid at higher or lower temperatures within the operating range can be used, including those which require superatmospheric pressures to maintain them in a liquid state at ambient temperatures.

Representative organic solvents which can be used include aliphatic alcohols, aldehydes, ketones, carboxylic acids, carboxylic esters, nitriles, ethers acetals, ketals, amines and halocarbons. The aliphatic groups in these liquids are generally hydrocarbyl groups, which can be straight chain or branched chain, and either saturated or unsaturated. The aliphatic groups are preferably alkyl except where otherwise noted, for reasons of their ready availability. The halogroups are generally chloro, fluoro or both.

Aliphatic alcohols which can be used have 4 to about 8 carbon atoms, preferably not more than 6 carbon atoms. The hydrogen bonding parameters of these alcohols are in the range 5 to 8, indicating a marked ability to associate with and therefore replace water from the membrane. These alcohols constitute one preferred class of solvents as defined having, in addition to favorable hydrogen bonding parameter values, limited capacities to absorb water.

Representative aliphatic aldehydes and ketones are those having from about 3 to 8 carbon atoms exemplified by acrolein, methacrolein, and methyl ethyl ketone. As a class, these solvents also have a fairly high affinity for water, with hydrogen bonding parameter values normally ranging from about 2 to 3.5, coupled with a limited capacity to absorb water.

Carboxylic acids having limited solubility for water typically exhibit a hydrogen bonding parameter of about from 2 to 5.5. Representative examples meeting the other requirements defined herein are butanoic acid, pent-4-enoic acid, and heptanoic acid. Carboxylic esters which can be used herein have from about 4 to 8 carbon atoms in the molecule and generally have hydrogen bonding parameters of about from 2.5 to 4.5 and limited solubility for water as defined.

Aliphtic nitriles such as butyronitrile, valeronitrile, acrylonitrile and methacrylonitrile have hydrogen bonding parameters of between about 2 and 3.5 and limited capacity to dissolve water as well as meet the other requirements defined herein, and thus are well suited for use in the practice of this invention. Acrylonitrile is a preferred solvent for its relatively low viscosity and small molar volume, making for a high rate of diffusion into the membrane and removal of water therefrom.

Representative ethers, acetals, ketals and amines include dimethyl ether, allyl ethyl ether, dimethoxy methane, 2,2-dimethoxy propane, and triethylamine. Such solvents have limited capacity to absorb water and are generally further characterized hydrogen bonding parameters of about from 2 to 4.

The halocarbons useful herein will normally contain 1 to 3 carbon atoms, at least one hydrogen atom, preferably at a carbon atom also bearing at least one halogen, the halogen normally being chlorine, fluorine, or both. Typical are methyl chloride, ethyl chloride, methylene chloride, chloroform, and trichloroethylene, all of which exhibit hydrogen bonding parameters in the range of 1 to 3 and meet the other requirements for the organic solvent defined herein.

Mixtures and aqueous solutions of such solvents, whether of the same or different chemical class, can be used to provide the replacement liquids for the instant process. The first replacement liquid used in the instant process can be organic solvent alone or organic solvent containing water up to substantial saturation. While such a substantially water saturated replacement liquid exerts little force for drawing water from the membrane, the low surface tension component of the treating liquid can diffuse into the membrane and exert a beneficial surface tension lowering effect in the membrane-wetting liquid.

This invention provides a balance of parameters which have been found to be operative in causing reductions in gas permeabilities of certain permselective membranes dried by other processes in which aqueous membrane liquids are replaced by nonaqueous liquids. These parameters apparently involve a balancing of the rate at which nonaqueous components of the replacement liquids are introduced into the membranes and the rates at which water is removed from the membranes. The present process employs, in the replacement liquids, organic solvents which penetrate into membrane structures wet with aqueous liquids. The particular process of this invention employs such organic solvents which penetrate rapidly into the membrane to produce a membrane wetting liquid having a reduced surface tension. This process further employs in at least the initial replacement liquid such a solvent which has a limited capacity to absorb water.

The contacting of the water-wet membrane with the replacement liquid can be carried out by any convenient means, including immersion, dipping or spraying the water-wet membrane. The period that the water-wet membrane should be contacted with each replacement liquid will vary with the types and concentrations of the organic solvent used, and will generally be adjusted to obtain substantial equilibrium between the membrane liquid and the replacement liquid. Substantially complete equilibrium is generally obtained in about from 1 to 24 hours of immersion but excellent results can be obtained in shorter contact times.

After the initial contact with a water replacement liquid containing an organic solvent having a limited solubility for water, the surface tension of the membrane wetting liquid is generally reduced to less than about 35 dynes per centimeter. The membrane can then be contacted in one or more further steps with the same or another replacement liquid to complete the removal of water from the membrane. For example, a replacement liquid can be added to a treating bath in which the membrane is submerged, with two or more steps merging into a continuous process when the replacement is made over a period of time.

Replacement liquids useful in such later steps in the water removal process can contain a wide variety of organic solvents, in addition to those having limited solubility for water, which have the required properties indicated above. Organic solvents which can be so used include water miscible aliphatic alcohols, ketones, ethers, acetals, ketals, esters, and nitriles. Preferred are alkanols containing 1 to 3 carbon atoms and nitriles such as acetonitrile and acrylonitrile.

The substantially complete removal of water from the membrane can also be effected with the organic solvent used in the original water replacement liquid. For example, a portion of the replacement liquid can be removed from the treatment vessel, dried by techniques such as distillation or passage through a drying tower, and returned to the treating vessel. A treating liquid such as methylene chloride can also be used that forms an azeotrope with water, with continual removal of the azeotrope, separation of water therefrom and returning the replacement liquid to the treating vessel until the membrane water is substantially completely removed. Repeated contacts with anhydrous organic solvent, of course, will also complete the removal of water from the membrane.

The removal of water from the membrane can be facilitated by the presence of a suitable adsorbent, such as a desiccant that forms hydrates, such as sodium sulfate, natural clays, diatomaceous earth, silica or alumina gel. Particularly satisfactory synthetic desiccants are those crystalline metal aluminosilicate molecular sieves commercially available from the Linde Division of Union Carbide Corporation as Types 3A, 4A and 5A, as well as those described by Hersh in "Molecular Sieves," Reinhold, New York (1961). The molecular sieve and the liquid components used in the drying process are chosen to provide sieve openings large enough to accommodate the molecule to be removed from the membrane but too small for the solvent molecules being used to replace it.

The proportion of replacement liquid to membrane water can vary widely. In general, in any one contact about from 1 to 500, more usually 10 to 200, volumes of replacement liquid per volume of membrane water are used. While larger and smaller volumes can be used in any particular step, they are not always convenient to handle. As with extractions in general, a multiplicity of extractions at convenient to handle volume ratios are more efficient than a single extraction involving a relatively large volume ratio.

In the instant process, after substantially complete removal of water from the originally water-wet membrane, the water replacement liquid is then removed. The usual technique for removing the water replacement liquid is to contact the liquid-wet membrane with another organic solvent or a series of solvents in one or more steps and thereby obtain the membrane wet with a liquid which can be evaporated without significant effect on the permselective properties of the resulting dry membrane and then to evaporate the liquid by conventional techniques at atmospheric or reduced pressure.

Liquids which can be so evaporated typically have low surface tension, are substantially non-polar and water-immiscible, and are capable of penetrating the membrane. They thus generally have a surface tension less than about 35 dynes per centimeter, a hydrogen bonding parameter less than about 3.0 (calories per cubic centimeter)$^{\frac{1}{2}}$, and an internal pressure less than about 100 calories per cubic centimeter. (The internal pressures of organic solvents can be measured directly or can be estimated from the dispersion and polar components of three-dimensional solubility parameters as described by Bagley, Nelson, and Scigliano in The Journal of Paint Technology, Volume 43, pages 35 to 42, 1971, employing solubility parameter values such as those tabulated by Hansen and Beerbower and by Barton in the references cited above.) Examples include benzene, carbon disulfide, methylene chloride, chloroform, carbon tetrachloride, 1,2-dichloroethane, 1,1,1-trichloroethane, and trichloroethylene.

Such liquids preferably have a surface tension less than about 25 dynes per centimeter, a hydrogen bonding parameter less than about 1 (calorie per cubic centimeter)$^{\frac{1}{2}}$, and an internal pressure less than about 70 calories per cubic centimeter. Examples include aliphatic and cycloaliphatic hydrocarbons having from four to eight carbon atoms and chlorofluorocarbons having one to three carbon atoms, including 1,2-dichloro-1,1,2,2-tetrafluoroethane. Of these, 1,1,2-trichloro-1,2,2-trifluoroethane has been found to give particularly satisfactory results.

A useful dry membrane can be obtained by evaporating the water replacement liquid of the last water replacing step in the process when such evaporation has a sufficiently small effect on the permselective separation properties of the resulting dry membrane. Thus, a water replacement liquid organic solvent can be used which can be evaporated without significant effect on the permselective properties of the resulting dry membrane and this solvent can be evaporated without replacement. Such solvents include diethyl ether, methyl chloride, chloroform, 1,1,1-trichloroethane, methylal, and methylene chloride.

The instant process results in the drying of water-wet, permselective membranes of high surface tension polymers without destruction of the structural features critical to their selective properties. Accordingly, the dried membranes are particularly effective in the separation of gaseous mixtures, with excellent permeation rates and selectivities. Representative of such gaseous mixtures are those found in a wide variety of industrial exhaust streams. For example, the membranes resulting from the instant process can be used to markedly increase the concentration of hydrogen in mixtures of hydrogen, nitrogen, methane, argon and ammonia typically resulting from the synthesis of ammonia. In addition, the dry membranes can be used for the separation of hydrogen and carbon monoxide, helium from natural gases such as air, hydrogen from petrochemical process streams, oxygen from air, and, in general, the separation of one rapidly diffusing gas from less permeable gases.

The invention is further illustrated by the following specific examples, in which weights and percentages are by weight unless otherwise indicated.

The polymer used for the preparation of the water-wet permselective asymmetric hollow fiber membrane used in Examples 1–18 and 20–21 was prepared by reacting a mixture of 70 parts of isophthaloyl chloride and 30 parts of terephthaloyl chloride with a substantially stoichiometric amount of a mixture of 80 parts of metaphenylenediamine and 20 parts of the calcium salt of metaphenylenediamine-4-sulfonic acid in dimethyl acetamide solution. This polymer was spun into hollow fiber form. The polymer preparation and spinning were substantially as described in Chen et al., U.S. Pat. No. 3,886,066, Example 1, except that the spinning conditions were modified to give hollow fibers with an outside diameter of 85 microns and an inside diameter of 43 microns. The resulting membranes were kept wet with water until used in the drying processes. This membrane was characterized as severely shrinkage-prone and showed poor flux in tests wherein isopropyl alcohol was used as the first replacement liuqid.

The gas separation permeation properties of the dried hollow fiber membranes described herein were determined with a single loop of a 150-fiber skein 18 inches long (making 300 fibers, each 9 inches long, as the arms of a U-tube) sealed into a metal tube having facilities for flushing with test gas and for collecting gas from the open bores of the hollow fiber membranes. The cell was first flushed with helium and the equilibrium rate of helium permeation through the membrane was determined at ambient temperature with an applied pressure of 400 psig. The cell was then flushed with nitrogen and the equilibrium rate of nitrogen permeation was determined with the same applied pressure. The observed permeation rates in seconds per cubic centimeter were converted into nano-Gas Transmission Rate (nGTR) units (cubic centimeters of gas permeated per second per square centimeter of effective membrane area per centimeter mercury of gas pressure × 10$^{-9}$) assuming the effective area of the fiber membranes to be the logarithmic mean of the outside and inside diameters. Selectivities for separating helium from nitrogen (helium/nitrogen) were calculated as the ratios of the observed permeation rates.

The gas separation permeation properties of dry film membranes were determined under substantially the same conditions as above with a circular portion of each membrane having an area of approximately 10 square centimeters mounted in a conventional pressure cell.

EXAMPLE 1

Hollow fiber membrane weighing about 0.5 g on a dry basis and containing about 1.38 g water was suspended as a vertical loop of a 150-fiber skein about 130 cm long, supporting a 1.56 gram weight, inside a 100 ml calibrated burette having an internal diameter of approximately 13.5 mm. The burette was filled at 20°–25° C with water-saturated n-butanol containing about 80 ml of the alcohol, immersing the hollow fiber membrane loop and providing about 88 volumes of the replacement liquid for each volume of water in the membrane. After soaking the membrane in the treating liquid for 30 minutes, the burette was drained and the soaking repeated three times with water-free butanol to remove water from the membrane. The burette was then drained and refilled with 1,1,2-trichloro-1,2,2-trifluoroethane ("Freon" 113) at 20°–25° C for a 1-hour soak. This was repeated two times. The membrane was then allowed to soak overnight in "Freon" 113. The burette was drained and the liquid adhering to it was evaporated at 25° C overnight under reduced pressure, the length of the membranes was noted, and the gas separation properties of the resulting dry membranes were determined as described above. The Helium flux in nGTR units, cc(NTP)/sec·cm$^2$·cm Hg·10$^{-9}$, as well as the He/N$_2$ selectivity ratio are given in the Table.

Similar beneficial results will be obtained if the procedure of Example 1 is repeated using unsaturated butanol solutions or water free butanol as the first replacement liquid, provided that the amount of such liquid is insufficient to dissolve more than the membrane water before saturation.

EXAMPLE 1A

The procedure of Example 1 was repeated except that water-free n-butanol was employed in all contacts and the soaking in the dry solvent repeated only two times. The quantity of water-free n-butanol used in each soaking was theoretically sufficient to absorb all of the water in the membrane. The amount of membrane water relative to that of the butanol corresponded to 3.7 mole percent compared to the saturation value of 51 mole percent at about 25° C. The results are shown in the Table.

EXAMPLES 2–11

Portions of the hollow fiber membrane weighing about 0.5 to 1 g on a dry basis and wet with about 2.75 g water/g membrane were dried by
 a. immersing for 18–20 hours at 25° C in 100 to 200 ml portions of the water-saturated liquids described in the Table in contact with 50 g of molecular sieve 3A (representing an excess of the amount needed to absorb all the water introduced with the solvent and contained in the membrane),
 b. rinsing three times by immersion at 25° C for 1 hour each time in 100–200 ml portions of "Freon" 113 followed by a final rinse in 25° C "Freon" 113 in contact with 50 g of molecular sieve 5A, the final rinse contact time being 18 hours in Examples 2, 6, 8, 9–11, 5 minutes in Examples 5 and 7, and 2–3 hours in Examples 3 and 4,
 c. evaporating liquid adhering to the membrane at 25° C overnight under reduced pressure.

The gas flux and selectivity were determined, and the results are reported in the Table. The somewhat less effective results obtained in Examples 9–11 with methyl ethyl ketone, acetylacetone and triethylamine may be attributed to a partial solubilizing or plasticizing effect of these solvents on the particular membrane employed.

EXAMPLE 12 AND 12B COMPARATIVE EXAMPLES B, C AND D

The procedure of Example 2 was repeated, except that in Example 12 the ratio of acrylonitrile to water was 72 instead of 200 and in Example 12B the treating liquid was anhydrous acrylonitrile.

The results are reported in the Table.

EXAMPLES 13–16

The procedure of Example 6 was repeated except that (a) there was employed a different spin of the membrane having substantially the same composition, structure and dimensions and (b) the butyl acetate was employed in both the wet and dry states, the ester being water-saturated in 13, dry in 14–16 and present in the solvent to membrane water ratios given in the Table. The ratio of 78 volumes of ester on a dry basis per volume of membrane water is theoretically sufficient for the ester to absorb all of the membrane water. The results reported in the Table show the beneficial effect of smaller ratios of the dry solvent to membrane water.

EXAMPLES 17 AND 18

0.7 Gram (dry basis) portions of hollow fiber membrane containing 1.92 of water were contacted with 72 ml of water-saturated n-propyl acetate or heptanoic acid, in Examples 17 and 18, respectively. The procedure used was that of the first step of Example 1, indicated in the Table as step 1. The membranes were then immersed in 200 ml of isopropyl alcohol for 2 hours (step 2 in the Table) and finally soaked in 200 ml of "Freon" 113 for 72 hours at 25° C before evaporation.

The tabulated results show that these relatively large-sized and slow diffusing low surface tension liquids are effective when used saturated with water to prepare the membrane for subsequent complete dehydration with isopropyl alcohol without destroying the membrane's gas separation properties.

If step 1 is omitted and the membrane is treated directly with isopropyl alcohol and subsequently dried as above, the resulting dry membrane will show substantially no gas flux.

EXAMPLE 19

A mixture of 70 parts of isophthaloyl chloride and 30 parts of terephthaloyl chloride was added portionwise to a dimethylacetamide solution of a substantially stoichiometric quantity of a mixture of 80 parts of 3-aminobenzhydrazide and 20 parts of 4-aminobenzhydrazide. The resulting polymer solution was poured into ice water and the precipitated polymer was washed substantially free of dimethylacetamide. A solution was prepared with 15% of this polymer in dimethylacetamide containing 30% of lithium nitrate and 40% of N,N'-diacetyl-N,N'-dimethyl-3,6-dioxa-1,8-octanediamine (the diacetamide of N,N'-dimethyltriglycoldiamine), and 0.5% triethanolamine (based on the polymer present). Films of this solution were cast on metal plates substantially as described by Richter et al. in U.S. Pat. No. 3,567,632. The film and supporting plate were placed for 10 minutes in a ventilted hood on a hot plate at 95° C to form a protomembrane and then were immersed in stirred room-temperature water for about 1 hour to obtain a film membrane. This film membrane was kept wet with water until used.

A sample of the water-wet film membrane weighing about 0.23 g on a dry basis and wet with 0.7 g water, and having an area of about 73 cm$^2$, was immersed for 18 hours in 400 ml n-butyl alcohol containing 51 mole percent water plus 50 g Molecular Sieve 3A and providing about 570 volumes of solvent for each volume of water in the membrane. The film was then immersed in anhydrous isopropyl alcohol for 2 hours, followed by 3 soaks, 1 hour each in 200 ml "Freon" 113, and finally for 72 hours in "Freon" 113 containing Molecular Sieve 5A. The solvent adhering to the film was removed by drying in air at room temperature. The resulting membrane was tested and showed the following properties:
He flux, nGTR: 44.9 M
Selectivity, He/$N_2$: 11

The symbol "M" denotes thousands in the tables and examples herein.

EXAMPLE 19A

The procedure of Example 19 was repeated except that anhydrous n-butyl alcohol was used instead of water-saturated butyl alcohol. The resulting membrane showed the following properties:
He flux, nGTR: 28.2 M
Selectivity, He/$N_2$: 21

EXAMPLE 20

A 20 ft portion of the hollow fiber membrane used in Examples 1–18 weighing about 2.19 g on a dry basis and wet with water (5.99 g) was coiled into a 150-fiber skein loop and immersed in 100 ml of methylene chloride ($CH_2Cl_2$) providing about 17 volumes of solvent for each volume of water in the membrane. The solvent was refluxed at 40° C for 2.5 hours while the vapors of the azeotrope were condensed, the two phases were separated, and the liquid $CH_2Cl_2$ was returned to the boiler. About 5.3 ml of membrane water was recovered. The membrane was then immersed in 200 ml. "Freon" 113 for 1 hour. The solvent adhering to the membrane was evaporated at 50° C under reduced pressure. The resulting membrane exhibited the following properties:
He flux, nGTR: 32.9 M
Selectivity, He/$N_2$: 387

EXAMPLE 21

A looped portion of the hollow fiber membrane containing about 100 centimeters of a 150-fiber skein was immersed for about 48 hours in about 200 milliliters of a mixture of 51.5% "Freon" 113 and 49.5% methylene chloride (by weight) containing about 60 grams of molecular sieve 3A and providing about 200 volumes of the water replacement liquid for each volume of water in the membrane. The membrane skein was removed from the liquid and the adherent liquid was evaporated under reduced pressure. The membrane showed 8.5% linear shrinkage. It exhibited the following properties:
He flux, nGTR: 33.4 M
Selectivity, He/$N_2$: 44

I claim:

1. In the process for drying a semipermeable polymeric membrane that is wet with an aqueous membrane-wetting liquid by contacting the wet membrane with at least one water replacement liquid inert to the membrane and to the membrane-wetting liquid to remove water from the membrane, and removing the replacement liquid from the membrane; the improvement which comprises contacting said wet polymeric membrane in which the polymer has a Critical Surface Tension of at least about 42 dynes per centimeter, at a temperature of about from 0° to 50° C. with a water replacement liquid consisting essentially of at least one organic solvent which is selected from the group consisting of aliphatic alcohols having 4–8 carbon atoms, aliphtic aldehydes having 3–8 carbon atoms and aliphatic ketones having 3–8 carbon atoms, carboxylic acids, carboxylic esters having 4–8 carbon atoms, aliphatic nitriles, ethers, acetals, ketals, amines, halocarbons having 1–3 carbon atoms and containing at least one hydrogen atom, and aqueous solutions thereof, said solvent having a surface tension at 20° C. of not more than about 35 dynes per centimeter, a viscosity less than about 10 centipoise, a molar volume less than about 200 cubic centimeters per mole at 20° C, a solubility for water not greater than about 20 weight percent at the contacting temperature, and a hydrogen bonding parameter of at least about 1 (calorie per cubic centimeter)$^\frac{1}{2}$; and after water has been substantially completely removed from the membrane, evaporating the replacement liquid to obtain a membrane free of water and replacement liquid.

2. A process of claim 1 wherein the quantity of the replacement liquid and its capacity for water solubility is insufficient to dissolve theoretically more than about 100 weight percent of the water with which the membrane is wet.

3. A process of claim 1 wherein the organic solvent in the replacement liquid exhibits a surface tension of not more than 30 dynes per square centimeter, a viscosity of less than about 6 centipoise and a molar volume at 20° C of less than about 130 cubic centimeters per mole.

4. A process of claim 1 wherein the quantity of the replacement liquid and its capacity for water solubility is insufficient to dissolve more than about 50% of the water with which the membrane is wet.

5. A process of claim 1 wherein the replacement liquid is substantially saturated with water.

* * * * *

TABLE

| Ex. | Water Replacement Liquid Solvent | Mole % $H_2O$ | Liquid Ratio* | Molar Volume at 20° C | Viscosity, centipoise at 20° C | Hydrogen Bonding Parameter | % Linear Shrinkage | He Flux nGTR | | Selectivity He/$N_2$ |
|---|---|---|---|---|---|---|---|---|---|---|
| 1 | n-$C_4H_9OH$ | 51 | 88 | 90 | 3 | | 7.7 | 6.1 | 72.4 M | 28 |
| 1A | n-$C_4H_9OH$ | 0 | 86 | 90 | 3 | | 7.7 | 13.6 | 6.7 M | 38 |
| 2 | $CH_2$=CHCN | 8 | 200 | 65.9 | 0.261 | ca. 3 | | 6.8 | 145 M | 50 |
| 3 | $(C_2H_5)_2O$ | 5 | 200 | 103.8 | 0.233 | | 2.5 | | 120.6 M | 12 |
| 4 | 1-$C_6H_{13}OH$ | 31 | 200 | 124.6 | 5.2 | ca. 6 | | | 108.9 M | 25 |
| 5 | $ClCH_2CH_2Cl$ | 1 | 200 | 80.1 | 0.80 | | 2.0 | 8.4 | 33.5 M | 22 |
| 6 | $CH_3COO(CH_2)_3CH_2$ | 7 | 200 | 131.6 | 0.732 | | 3.1 | 8.4 | 33.4 M | 34 |
| 7 | $CH_2Cl_2$ | 0.42 | 200 | 59.5 | 0.43 | | 3.0 | 8.1 | 27.2 M | 83 |
| 8 | $C_2H_5COC_2H_5$ | 11 | 200 | 107.9 | 0.471 | ca. 2.5 | | 9 | 21.7 M | 60 |
| 9 | $(C_2H_5)_3N$ | 21 | 200 | 139.1 | 0.363 | ca. 2-3 | | 11.4 | 12.1 M | 4 |
| 10 | $CH_3COCH_2COCH_3$ | 21 | 200 | 103 | 0.90 | >2.5 | | 11.7 | 6.1 M | 217 |
| 11 | $CH_3COC_2H_5$ | 35 | 200 | 86.7 | 0.428 | | 2.5 | 13 | 2.2 M | 40 |
| 12 | $CH_2$=CHCN | 8 | 72 | 65.9 | 0.261 | | | | 48.2 M | 50 |
| 12B | $CH_2$=CHCN | 0 | 72 | 65.9 | 0.261 | | | | 39.5 M | 22 |
| 13 | $CH_3COO(CH_2)_3CH_2$ | 7 | 78 | 131.6 | 0.732 | | | | 26.5 M | 69 |
| 14 | $CH_3COO(CH_2)_3CH_3$ | 0 | 78 | 131.6 | 0.732 | | | | 18.7 M | 12 |
| 15 | " | 0 | 39 | 131.6 | 0.732 | | | | 41 M | 22 |
| 16 | " | 0 | 20 | 131.6 | 0.732 | | | | 72.4 M | 8 |
| | Step | | | | | | | | | |
| 17 | 1  $CH_3COO(CH_2)_2CH_3$ | 9 | 72 | 115.1 | 0.59 | ca. 3.5 | | | | |
| | 2  i-PrOH | 0 | — | 75.6 | 2.4 | | | | 10.9 M | 168 |
| 18 | 1  n-$C_5H_{13}COOH$ | 3 | 72 | 141.6 | 4.33 | ca. 3.5 | | | | |
| | 2  i-PrOH | 0 | — | 75.6 | 2.4 | | | | 15.5 M | 61 |

*Solvent volume/water in wet fiber.